(12) United States Patent
Hiscock et al.

(10) Patent No.: US 10,173,648 B2
(45) Date of Patent: Jan. 8, 2019

(54) ASSEMBLY FOR WASHING VEHICLES

(71) Applicant: Alfred Kärcher GmbH & Co. KG, Winnenden (DE)

(72) Inventors: Fred Hiscock, Newark (GB); Peter Spencer, Banbury (GB)

(73) Assignee: Alfred Kärcher SE & Co. KG, Winnenden (DE)

( * ) Notice: Subject to any disclaimer, the term of this patent is extended or adjusted under 35 U.S.C. 154(b) by 563 days.

(21) Appl. No.: 14/698,060

(22) Filed: Apr. 28, 2015

(65) Prior Publication Data

US 2015/0232069 A1    Aug. 20, 2015

Related U.S. Application Data

(63) Continuation of application No. PCT/GB2013/052804, filed on Oct. 28, 2013.

(30) Foreign Application Priority Data

Nov. 1, 2012  (GB) .................................. 1219615.0

(51) Int. Cl.
*B60S 3/06* (2006.01)
*A46B 13/00* (2006.01)

(52) U.S. Cl.
CPC ............ *B60S 3/063* (2013.01); *A46B 13/001* (2013.01)

(58) Field of Classification Search
CPC .............................. B60S 3/063; A46B 13/001
See application file for complete search history.

(56) References Cited

U.S. PATENT DOCUMENTS

| | | | |
|---|---|---|---|
| 4,039,014 A | 8/1977 | Sellars | |
| 4,608,726 A | 9/1986 | Hanna | |
| 4,715,079 A | 12/1987 | Kekewich et al. | |
| 5,361,443 A | 11/1994 | Belanger et al. | |
| 5,715,558 A | 2/1998 | Johnson | |
| 5,898,966 A | 5/1999 | Kaady | |
| 5,930,859 A * | 8/1999 | Ennis | B60S 3/063 15/53.3 |
| 2005/0268411 A1 | 12/2005 | Ennis | |
| 2006/0218734 A1 * | 10/2006 | Prater | B60S 3/063 15/53.2 |
| 2006/0260076 A1 | 11/2006 | Hanna | |
| 2010/0017979 A1 | 1/2010 | Ennis | |

FOREIGN PATENT DOCUMENTS

| | | |
|---|---|---|
| DE | 44 04 998 | 8/1995 |
| EP | 0 842 835 | 5/1998 |
| EP | 1 900 581 | 3/2008 |
| GB | 1042921 | 9/1966 |
| GB | 2 145 682 | 4/1985 |

* cited by examiner

*Primary Examiner* — Randall Chin
(74) *Attorney, Agent, or Firm* — Womble Bond Dickinson (US) LLP

(57) ABSTRACT

An assembly including an arm having a rotatable brush for cleaning a vehicle, the arm being rotatable about a generally vertical axis to move the brush between a parked position and a deployed position, the arm being supported by a mechanism such that the arm is in a raised position when the brush is in the parked position and the arm is in a lowered position when the brush is in the deployed position and the arm is biased to move the brush towards the deployed position by the mechanism.

24 Claims, 11 Drawing Sheets

ASSEMBLY FOR WASHING VEHICLES

CROSS-REFERENCE TO RELATED APPLICATIONS

The present application is a continuation of international application number PCT/GB2013/052804, filed on Oct. 28, 2013, which claims the benefit of British application number 1219615.0, filed on Nov. 1, 2012, which are incorporated herein by reference in their entirety and for all purposes.

BACKGROUND OF THE INVENTION

The present invention relates to an assembly, in particular an assembly for use in a machine used to wash vehicles, in particular road vehicles, more particularly large road vehicles such as buses and trucks.

Four brush coach cleaning machines are known. They consist of four brushes, each rotatable about a vertical axis and each mounted on an arm. Each brush is taller than the vehicle it is designed to wash. The vehicle is driven through the washing facility slowly to allow each brush to wash appropriate part of the vehicle. One of the brushes washes approximately half the front of the vehicle and one side, another of the brushes washes the other half of the front of the vehicle and the other side, a third brush washes one side of the vehicle and half of the rear of the vehicle and the fourth brush washes the opposite side of the vehicle and the other half of the rear of the vehicle. Each brush is driven by an associated electric motor and gear box positioned above the brush. The motors and gear boxes are heavy and difficult to install because they are positioned at a height above the top of the coach, i.e. typically 3 meters or more above the ground. Because copious amounts of water are used during washing the motor and gear box have to be appropriately sealed against ingress of water. However, such motors and gear boxes are not reliable.

Furthermore, as the vehicle drives through the washing facility the arms need to move to ensure the brushes remain in contact with the vehicle but are not forced into engagement with a vehicle too heavily. If the brushes are forced into engagement with the vehicle then there is a risk of damage to paintwork of the vehicle and excess wear to the brush bristles.

Air operated actuators have been used to control the rotational movement of the arm which hold the brushes. However, such actuators are prone to leak and corrode especially in view of the copious amounts of water used during the washing process.

Accordingly there is a need for an improved vehicle washing machine.

SUMMARY OF THE INVENTION

Thus according to the present invention there is provided an assembly including an arm having a rotatable brush for cleaning a vehicle, the arm being rotatable about a generally vertical axis to move the brush between a parked position and a deployed position, the arm being supported by a mechanism such that the arm is in a raised position when the brush is in the parked position and the arm is in a lowered position when the brush is in the deployed position and the arm is biased to move the brush towards the deployed position by the mechanism.

The mechanism may include a ramp arrangement having a ramp to move the arm between the raised position and the lowered position.

The ramp may have a ramp angle that is constant over the whole arc movement of the arm. Alternatively, the ramp angle may vary over the arc movement of the arm.

According to another aspect of the present invention there is provided a washing facility for washing road vehicles including four assemblies, each including an arm having a rotatable brush for cleaning a vehicle, the arm being rotatable about a generally vertical axis to move the brush between a parked position and a deployed position, the arm being supported by a mechanism such that the arm is in a raised position when the brush is in the parked position and the arm is in a lowered position when the brush is in the deployed position and the arm is biased to move the brush towards the deployed position by the mechanism, the washing facility further including a building for housing the four assemblies.

According to another aspect of the present invention there is provided a vehicle washing facility for washing road vehicles including an assembly including an arm having a rotatable brush for cleaning the road vehicle, the arm being rotatable about a generally vertical axis to move a brush between a parked position and a deployed position, the assembly including a hydraulic actuator for moving the arm from a deployed position to a parked position, the assembly including a hydraulic motor for rotating the brush about a generally vertical brush axis.

The vehicle washing facility may include four assemblies, each assembly including an arm having a rotatable brush for cleaning the road vehicle, the arm being rotatable about a generally vertical axis to move a brush between a parked position and a deployed position, the assembly including a hydraulic actuator for moving the arm from a deployed position to a parked position, the assembly including a hydraulic motor for rotating the brush about a generally vertical brush axis.

The vehicle washing facility may be enclosed within a building.

The invention will now be described, by way of example only, with reference to the accompanying drawings.

DETAILED DESCRIPTION OF THE INVENTION

With reference to FIGS. 1 to 10 there is shown a washing facility 10 for cleaning large vehicles such as buses, coaches and lorries. The washing facility includes a roadway 12 down which the vehicle 14 is driven slowly. The roadway 12 has kerbs 15 and 16 which act to prevent the vehicle being driven too far to the right or too far to the left as it progresses through the washing facility. The washing facility is enclosed in a building 17, only the right hand wall of which is shown. The building will include a roof (not shown), a left hand wall (not shown), may include a front door, through which the vehicle enters and may include a rear door, through which the vehicle exits. The washing facility includes a pre wetting gantry 18 and a drying gantry 19. The roadway 12 is contoured such that water used during washing flows to a central drain 20 and then on to a sump (not shown) whereupon it can be recycled.

Figure 2:
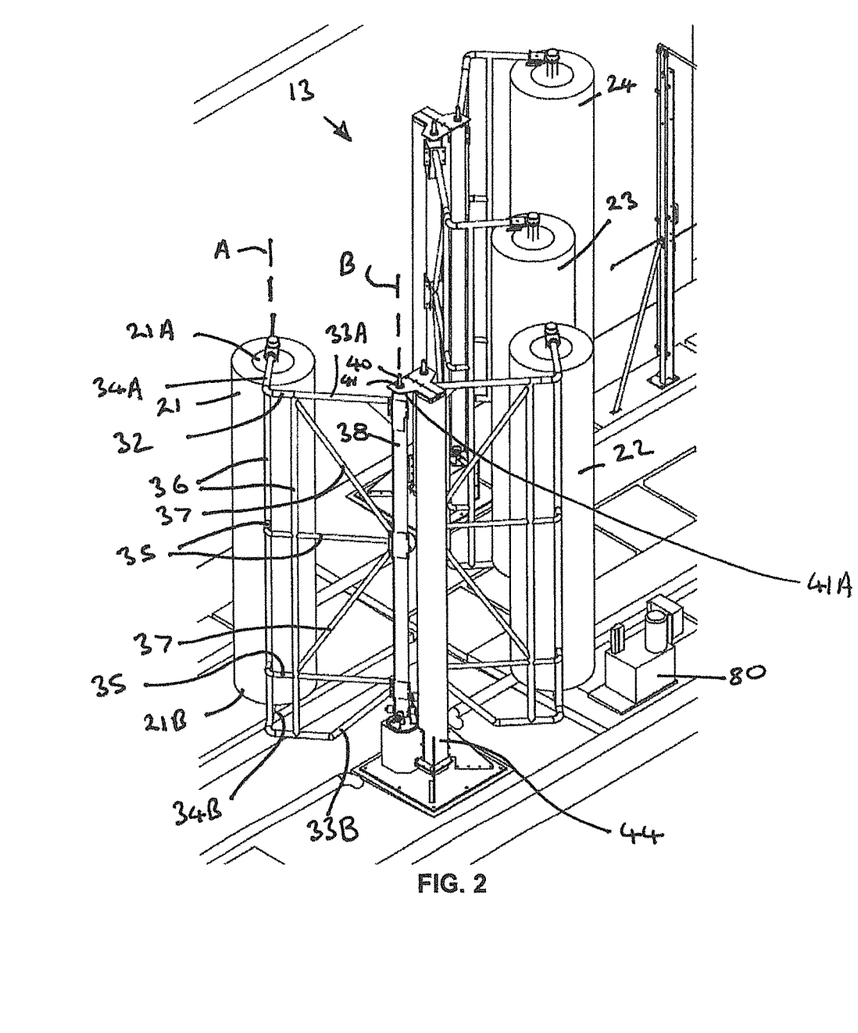
FIG. 2 is an enlarged view of part of FIG. 1.
Figure 3:
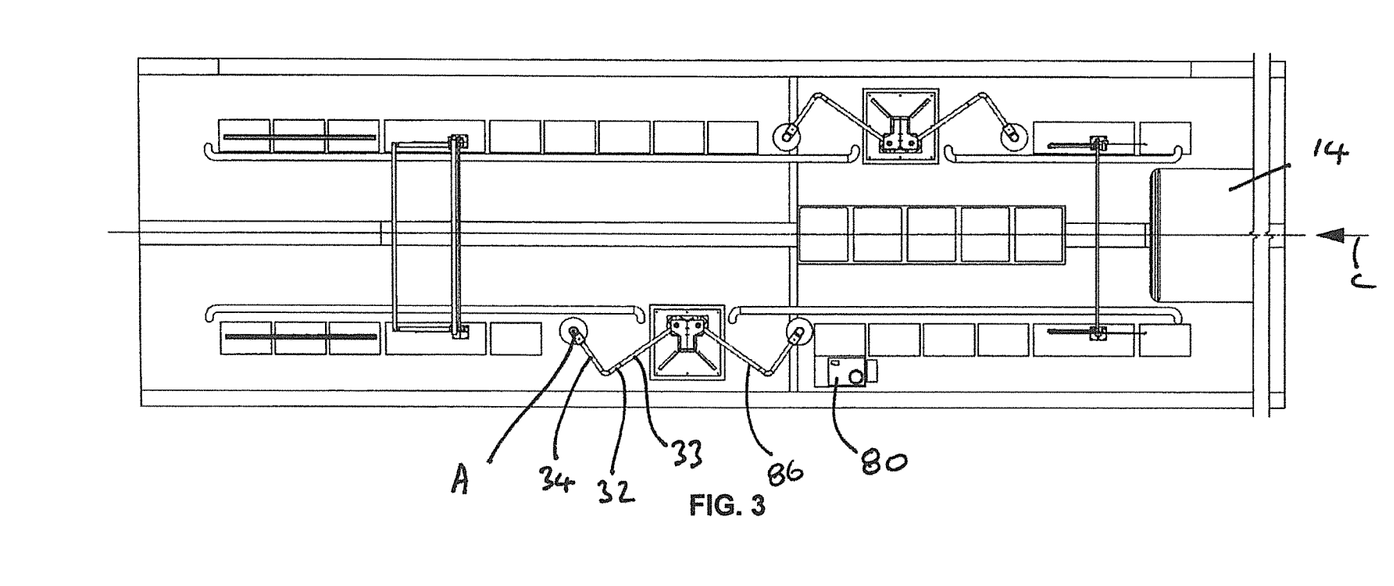
FIG. 3 is a plan view of FIG. 1 showing the brushes in a parked position.

As best seen in FIGS. 2 and 3, the washing facility includes a four brush washer 13 having first brush 21, second brush 22, third brush 23 and fourth brush 24.

First brush 21 is rotatably mounted about a generally vertical brush axis A. The brush 21 includes a brush shaft 30 to which is attached a plurality of flexible bristles 31. An arm 32 supports the first brush 21 at the top 21A of the first brush 21 and at the bottom 21B of the first brush 21. In plan view (see FIG. 3) the arm has an inner part 33 connected to an outer part 34. The inner and outer parts are orientated at 90 degrees to each other. The outer part 34 includes a top outer part 34A and a bottom outer part 34B. The inner part 33 includes a top inner part 33A and a bottom inner part 33B. The arm 32 further includes various horizontal bracing structures 35, vertical bracing structures 36 and diagonal bracing structures 37. At an inner end the arm 32 is connected to a column 38. Column 38 includes a central section 39 of square section. At the top of the central section there is a shaft 40 which is received in bearing 41 and at the bottom of the central section 39 there is a shaft 42 received in bearing 43. The column 38, and hence the arm 32 are rotatable about a generally vertical column axis B.

The bearings 41 and 43 are supported in respective housings 41A and 43A. Housings 41A and 43A form part of support column 44. Support column 44 is rigidly fixed to the ground via base plate 45.

Figure 4:
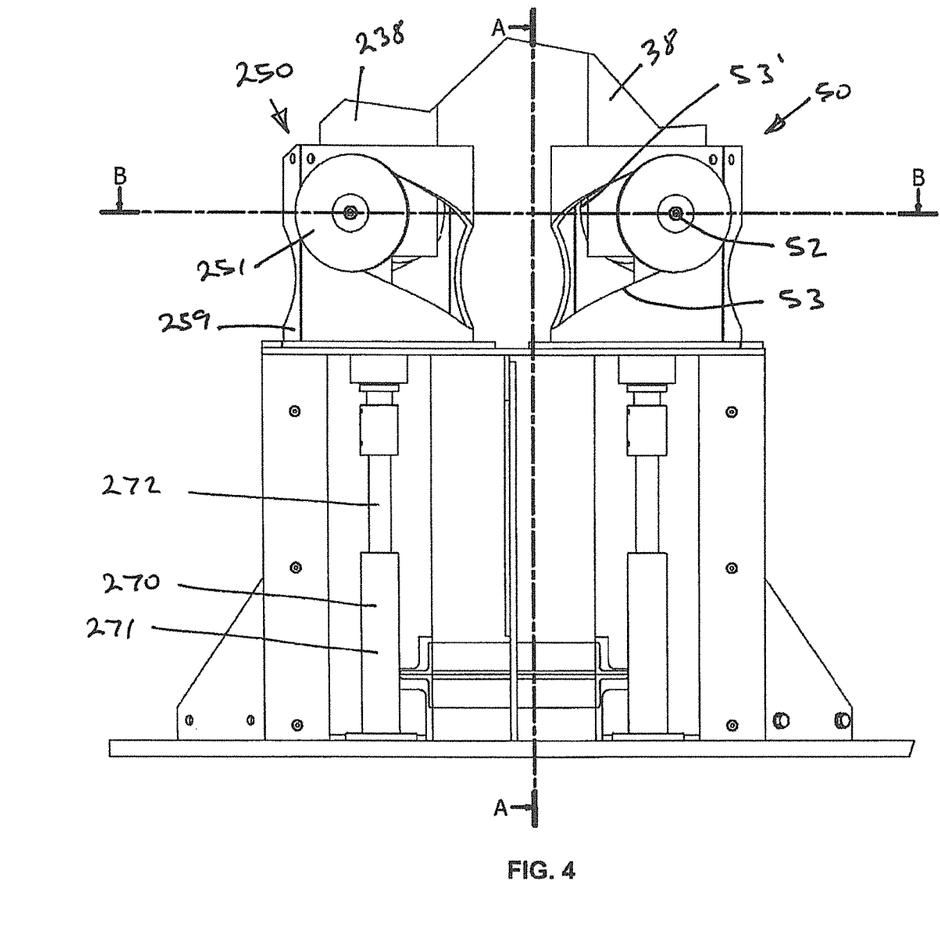
FIG. 4 is a side view of part of the mechanism used in FIG. 1.
Figure 5:
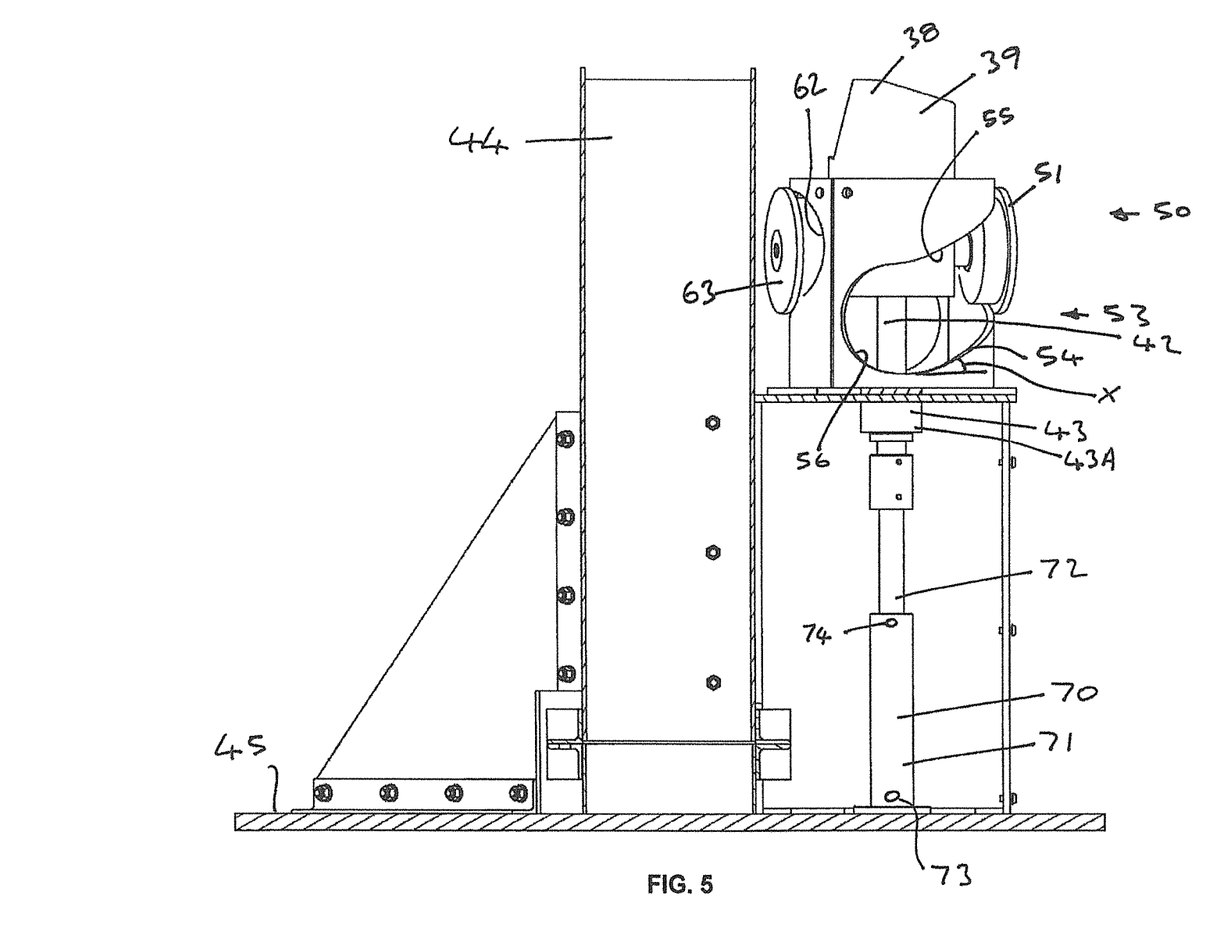
FIG. 5 is a cross-section taken along the line A-A of FIG. 4.
Figure 6:
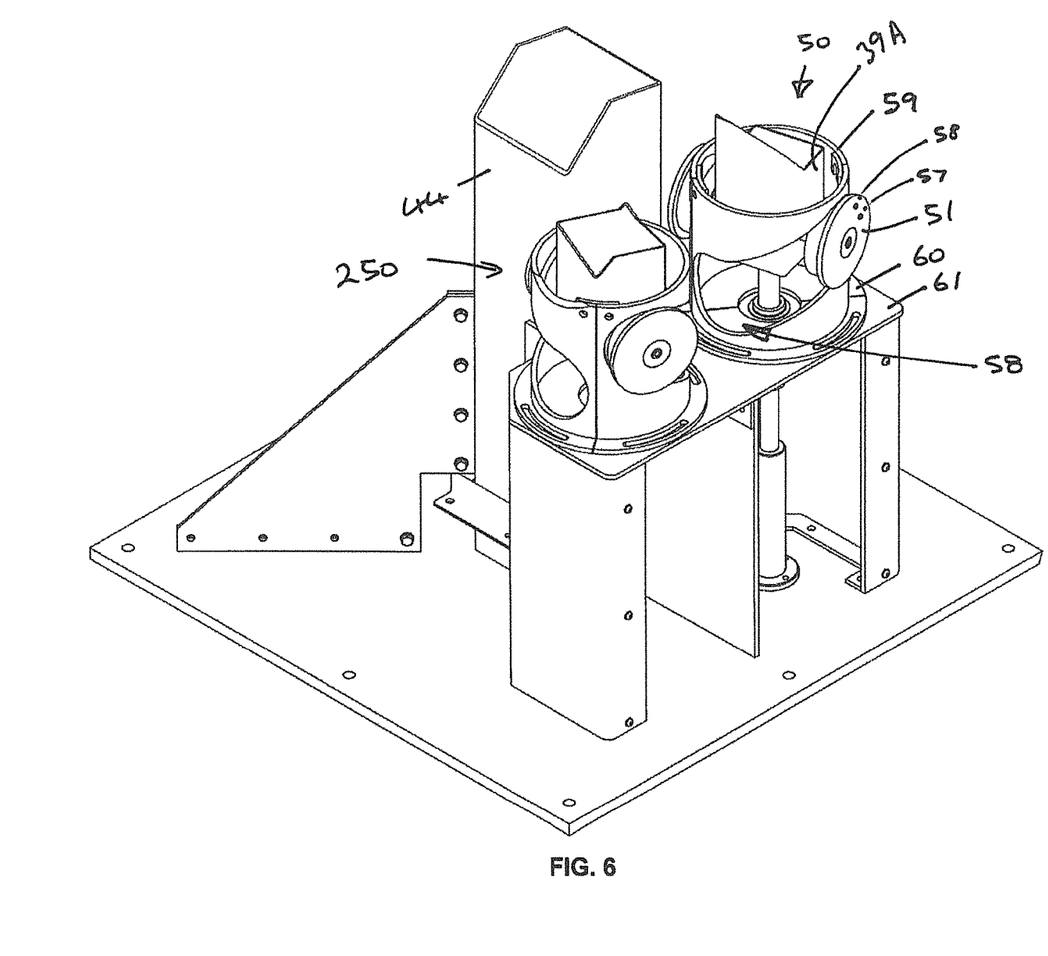
FIG. 6 is an isometric view of FIG. 4.
Figure 7:
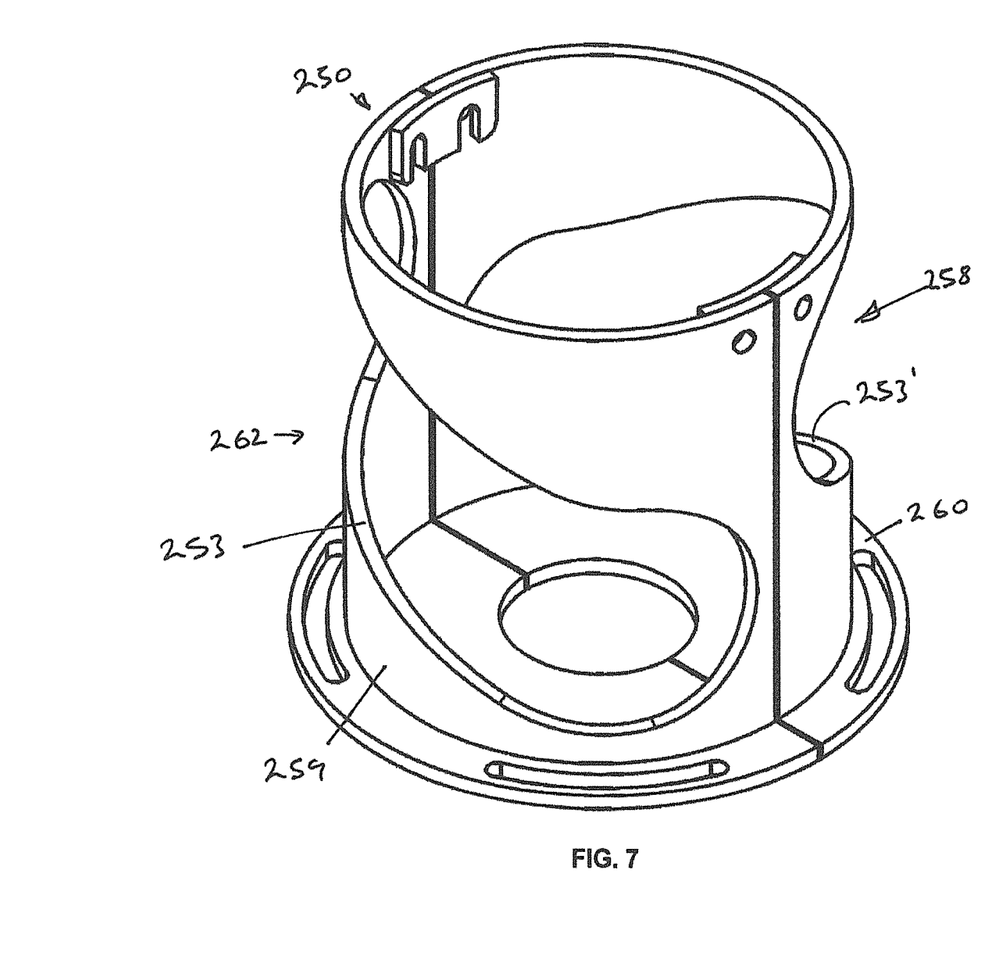
FIG. 7 is an isometric view of part of FIG. 4 shown in isolation.
Figure 8:
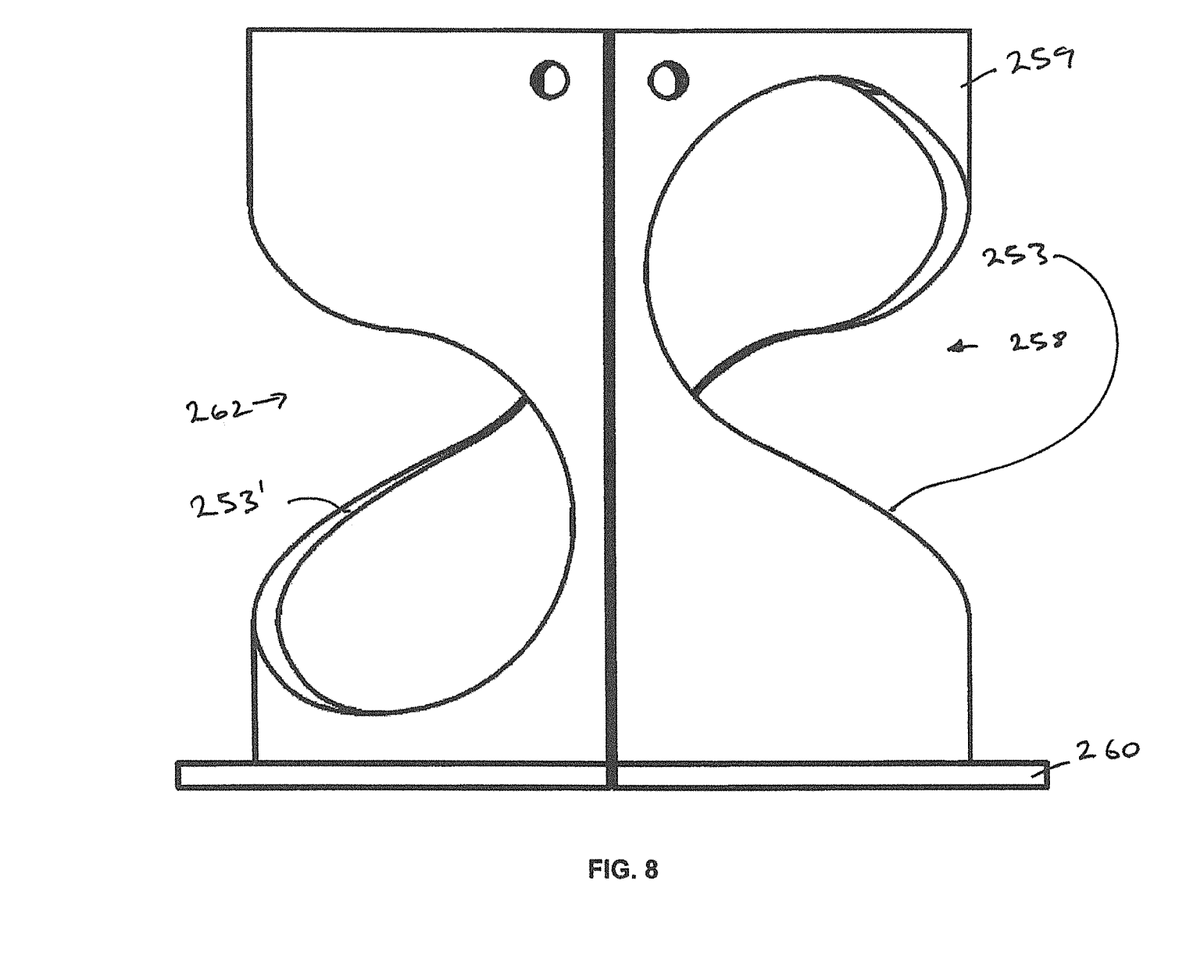
FIGS. 8 and 9 are side views of FIG. 7.
Figure 9:
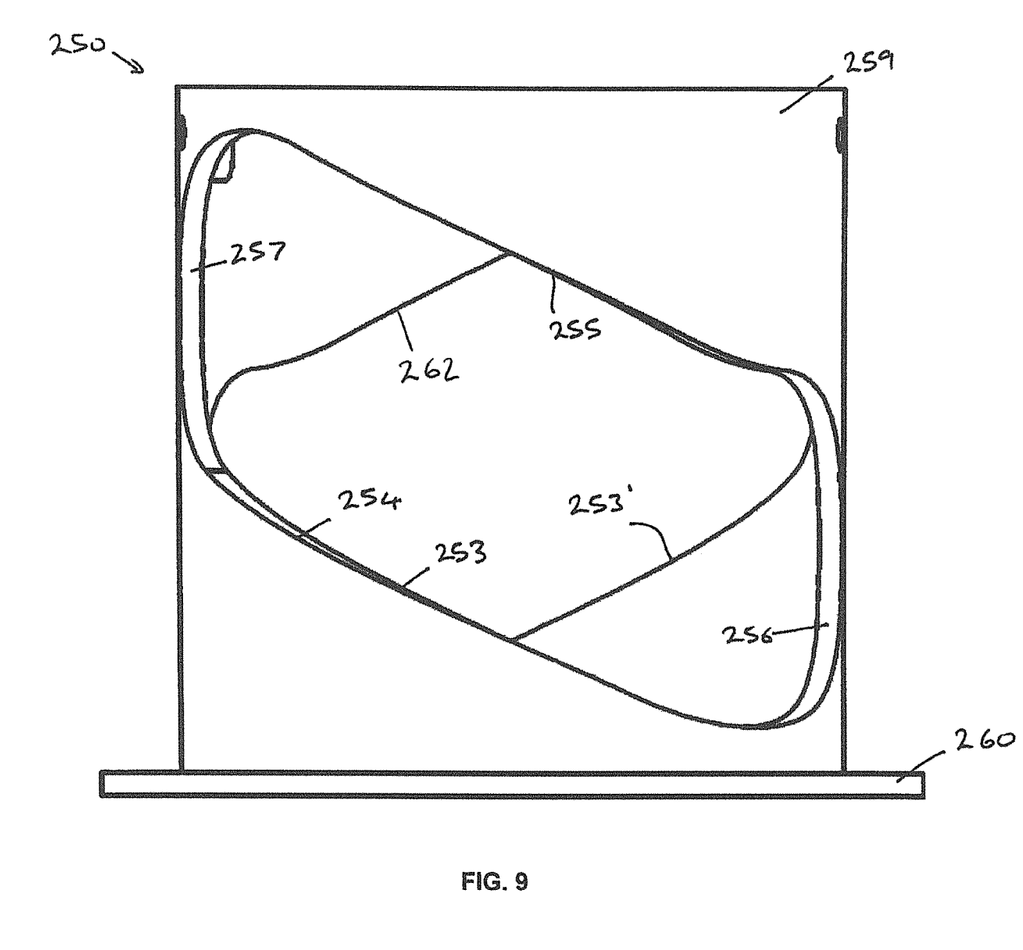
Figure 10:
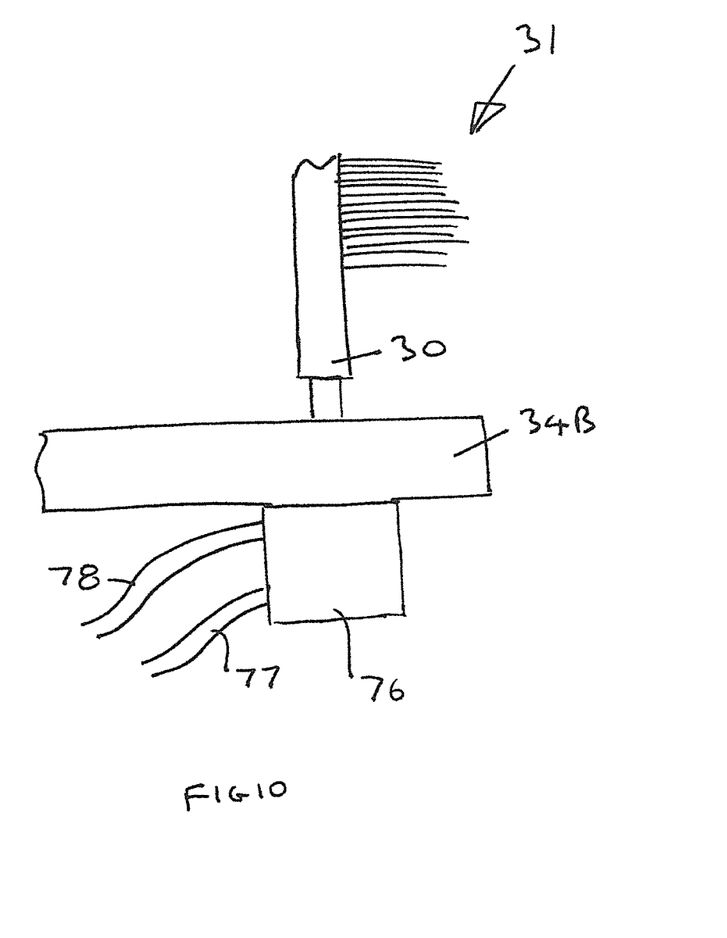
FIG. 10 (shown schematically) is a view of part of FIG. 1 showing a hydraulic motor.

At the lower end of the centre section 39 is a mechanism 50 (see FIGS. 4, 5 and 6). The mechanism 50 includes a wheel 51 which is rotatable about a generally horizontal axis defined by fixing bolt 52. Fixing bolt 52 is attached to one side 39A of the central section 39. The mechanism further includes a ramp arrangement shown generally at 53. The ramp arrangement 53 consists of a first ramp 54, a second ramp 55, a first stop 56 and a second stop 57 (obscured by wheel 51 in FIG. 6). The first ramp, second ramp, first stop and second stop are defined by the edge of a hole 58 formed in a circular tube 59. Accordingly the first ramp, second ramp, first stop and second stop are contiguous. The circular tube 59 is fixed via flange 60 to a plinth 61 which is attached to the base plate 45. Accordingly, the circular tube 59 is fixed relative to the ground. It will be noted that the first ramp 54 is generally parallel to the second ramp 55. The second ramp 55 is on an opposite side of the wheel 51 to the first ramp.

The circular tube 59 includes a further ramp arrangement 53' defined by hole 62 which is diametrically opposite to hole 58 and shaped identically to hole 58. The central section 39 of the column includes a further wheel 63 on an opposite side of the central section to wheel 51. Further wheel 63 is mounted in a similar manner to the column as wheel 51.

Positioned beneath shaft 42 is a hydraulic actuator, in this case a hydraulic ram 70 having a cylinder 71 fixed to the base plate 45 and an actuating shaft 72 connected to a piston (not shown) contained within the cylinder 71. Hydraulic connection 73 and 74 are provided to supply pressurised hydraulic fluid to the cylinder and to vent hydraulic fluid from the cylinder as appropriate.

Operation of the mechanism 50 is as follows.

Figure 1:
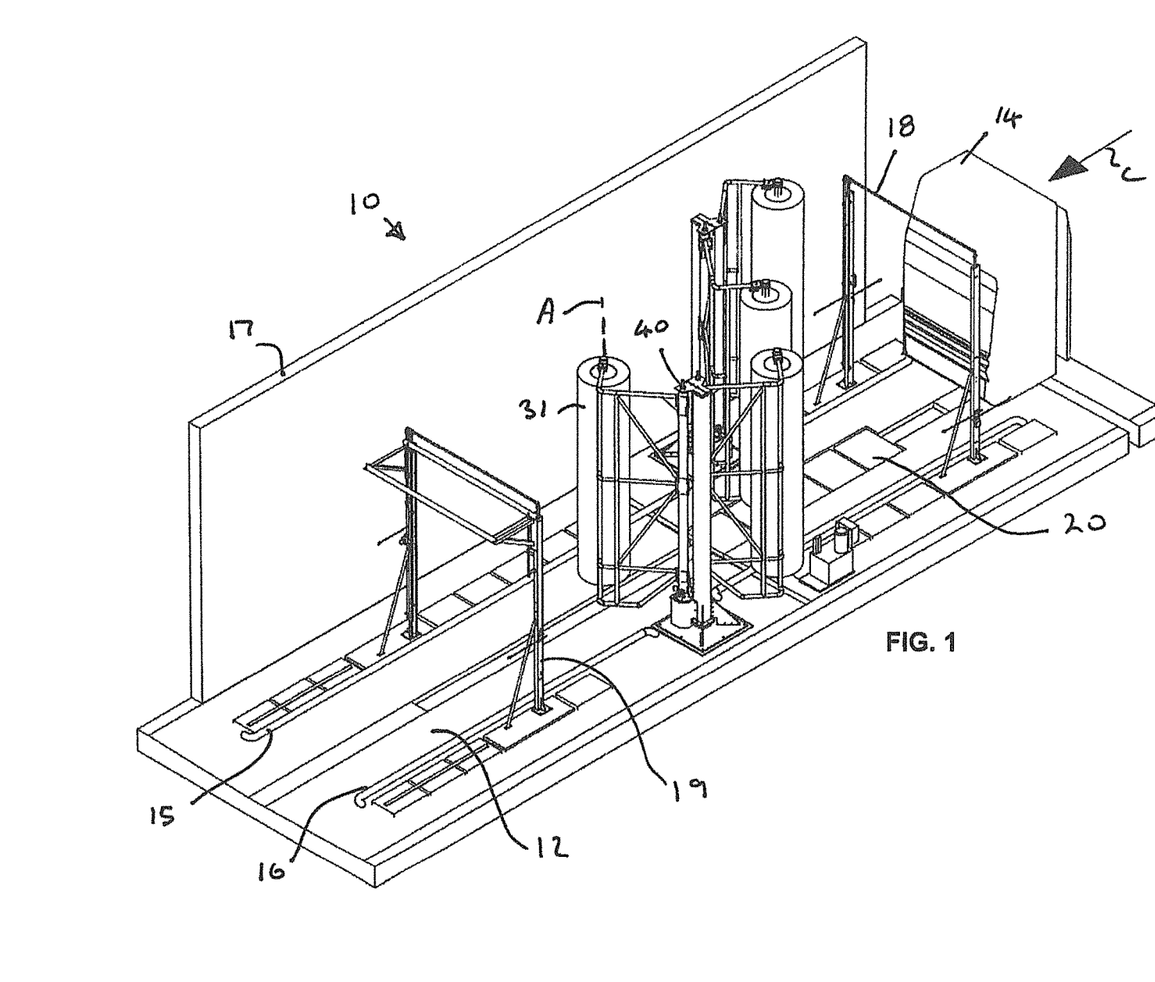
FIG. 1 is an isometric view of a washing facility including an assembly according to the present invention.

When the washing facility is not being used to clean a vehicle the first brush 21 will be in a park position as shown in FIG. 3. In this position the brush will not be rotating, and hence, as shown in FIG. 3 the brush diameter is smaller than compared with the brush diameter as shown in FIG. 1. This is because as shown in FIG. 3 the brush is not rotating and hence the brush bristles have not been centrifuged outwardly. This can be contrasted with FIG. 1 wherein the brush is rotating and hence the brush bristles have been centrifuged out.

When the washing facility is being used to wash a vehicle the first brush 21 has various deployed positions as will be described further below, but as shown in FIG. 1 the first brush 21 is in its fully deployed position.

In summary the brush 21 can be moved from its fully deployed position shown in FIG. 1 to its park position shown in FIG. 3 by operating the hydraulic ram 70 to lift or elevate the column 38. As the column is lifted the wheel 51 contacts the second ramp 55 which causes the column 38 to rotate as the wheel is progressively lifted. By releasing the pressure in the hydraulic ram 70, the weight of the column causes wheel 51 to contact the first ramp 54 which causes the column 38 to rotate as the column progressively falls. The further ramp arrangement 53' acts together with the further wheel 63 in a manner similar to the interaction of the ramp arrangement 53 and wheel 51 as described above.

In more detail, as shown in FIG. 5 the column 38 is in a raised position and this raised position corresponds to the parked position of the first brush 21 as shown in FIG. 3. The column 38 can be held in this raised position by virtue of pressure within the hydraulic ram holding the actuating shaft 72 in a raised position and hence holding the column 38 in a raised position. In order to move the first brush 22 to its fully deployed position, pressure within the cylinder 71 is released thereby allowing the column to move downwardly under its own weight. As the column moves downwardly the wheel 51 engages first ramp 54 thereby causing the column to rotate clockwise when viewing FIG. 3 by virtue of the column being rotatably supported in the bearings 41 and 43. Note that as the column descends the shafts 40 and 42 slide within bearings 41 and 42 respectively. The first brush is prevented from moving past the fully deployed position as shown in FIG. 5 by virtue of the wheel 51 engaging the first stop 56 preventing further rotation of the column 38. In order to return the first brush 21 to the parked position (in the absence of a vehicle), then the cylinder 71 is pressurized thereby causing actuating shaft 72 to lift the column 38. As the column lifts the wheel 51 engages a left hand part of the second ramp 55 (when viewing FIG. 4) and progressive lifting of the column causes the wheel 51 to move rightwardly along the second ramp 55 thereby rotating the column 38 anticlockwise when viewing FIG. 3 such that the first brush 21 moves to the parked position. The first brush is prevented from moving past the parked position by virtue of contact between the wheel 51 and the second stop 57.

For ease of explanation, the description above has primarily been in respect of wheel 51 and its interaction with hole 58. As will be appreciated, further wheel 63 interacts in a similar manner to further hole 62 and hence the forces causing column 38 to rotate are generated by the interaction of wheel 51 and hole 58 and also by the interaction of further wheel 63 with further hole 62.

Brushes 22, 23 and 24 each have associated arms similar to arm 32 and have associated mechanism similar to mechanism 50. One skilled in the art would appreciate how brushes 22, 23 and 24 are therefore moved between their associated parked positions and deployed positions.

At the outboard end of the bottom outer part 34B there is provided a hydraulic motor 76, the hydraulic motor rotates about an axis coincident with the axis of rotation of the brush shaft 30. The hydraulic motor 76 is directly coupled to the brush shaft 30 and therefore rotates at the same speed as the brush shaft 30. As will be appreciated, there is no gearbox or the like between an output shaft of the hydraulic motor and the brush shaft. The hydraulic motor is supplied with pressurized fluid via hydraulic lines 77 and 78.

The washing facility 10 includes a further mechanism 250 having features which perform the same function as those of mechanism 50 being labelled 200 greater. However, as will be appreciated, as column 238 is moved to its raised or lifted position as shown in FIG. 4 from the lowered position, column 238 rotates clockwise when viewed from above as opposed to column 38 which rotates anticlockwise when lifted to its raised position when viewed from above. The third brush 23 is moved by a mechanism similar to mechanism 250. The fourth brush 24 is moved by a mechanism similar to mechanism 50.

In summary, a vehicle is cleaned by it being driven relatively slowly along the roadway 12 in the direction of arrow C. The front of the vehicle will progressively move passed the fourth brush, then the third brush, then the second brush, then the first brush. As it moves passed each brush certain parts of the vehicle will be cleaned as further described below.

Operation of first brush 21 when washing a vehicle is as follows.

The brush 21 is moved to its fully deployed position as shown in FIG. 2 by releasing the pressure in cylinder 71 which allows the column 38 to fall to a lowered position corresponding to a fully deployed position of the brush 21. Pressurized hydraulic fluid is supplied to the hydraulic motor 76 from hydraulic pump 80 which causes the motor shaft to rotate which in turn causes the brush shaft 30 to rotate. The motor is configured to rotate the brush anticlockwise when viewing FIG. 3. The vehicle 14 is driven slowly in the direction of arrow C through the pre-wetting gantry 18 which pre-wets the vehicle. Ultimately the front of the vehicle will touch the rotating bristles of brush 21. As best seen in FIG. 3, in the fully deployed position, the brush 21 is slightly to the right of the central line of the roadway when viewing in the direction of movement of the vehicle. Accordingly, the brush 21 will start to clean the vehicle slightly to the right of its centre line. As the vehicle continues in the direction of arrow C the vehicle pushes on the rotating bristles which cause the arm 32 to progressively rotate anticlockwise which results in the bristles moving leftward relative to the front of the vehicle. Continued movement of the vehicle causes arm 32 to move to a position wherein the brush 21 is cleaning the left hand side of the vehicle. Continued movement of the vehicle in the direction of arrow C causes the whole of the left hand side of the vehicle to be cleaned as it passes brush 21. Once the vehicle has driven past brush 21 the brush will turn to the fully deployed position. As will be appreciated, the brush has various deployed positions depending upon which part of the vehicle is being cleaned.

As will be appreciated, as the vehicle moves the arm 32 anticlockwise, the wheel 51 will be rotated about the column axis B and hence will be driven up ramp 54. Thus, the vehicle will cause the column to move from a lowered position to a raised position.

As will be appreciated, for any particular deployed position the forces acting to push the rotating brush 21 against the vehicle are determined by the ramp 54 and in particular by the ramp angle. The ramp 54 therefore provides a simple method of forcing the brush against the vehicle. In particular the mechanism 50 does not rely on pneumatic actuators or electric actuators to force the brushes to contact with the vehicle.

The second brush 22, third brush 23 and fourth brush 24 all have associated components as described above in respect of first brush 21 to enable them to operate in a similar manner to the first brush as described above.

From the above description one skilled in the art will appreciate that the third brush 23 acts in a similar manner to the first brush 21, but will clean the front right hand half of the vehicle and the right hand side of the vehicle.

The second brush 22 operates in a similar manner to the first brush 21 but is arranged to clean the left hand side of the vehicle and the rear left half of the vehicle. Thus, when the vehicle is driven through the washing facility the second brush 22 will be positioned as shown in FIG. 2, by virtue of pressure in its associated hydraulic cylinder. Once the front left hand corner of the vehicle has moved past the second brush 22 pressure in the cylinder can be released since the brush will then be held in position by virtue of the rotating bristles engaging the side of the vehicle. Once the rear left corner of the vehicle has passed the second brush 22, then the associated mechanism causes the arm 86 associated with the second brush to swing anticlockwise when viewing FIG. 3 thereby causing the second brush 22 to progressively wash the rear left hand half of the vehicle.

The fourth brush 24 acts in a similar manner to the second brush 22 except it washes the right hand side of the vehicle and the rear right half of the vehicle.

Figure 11:
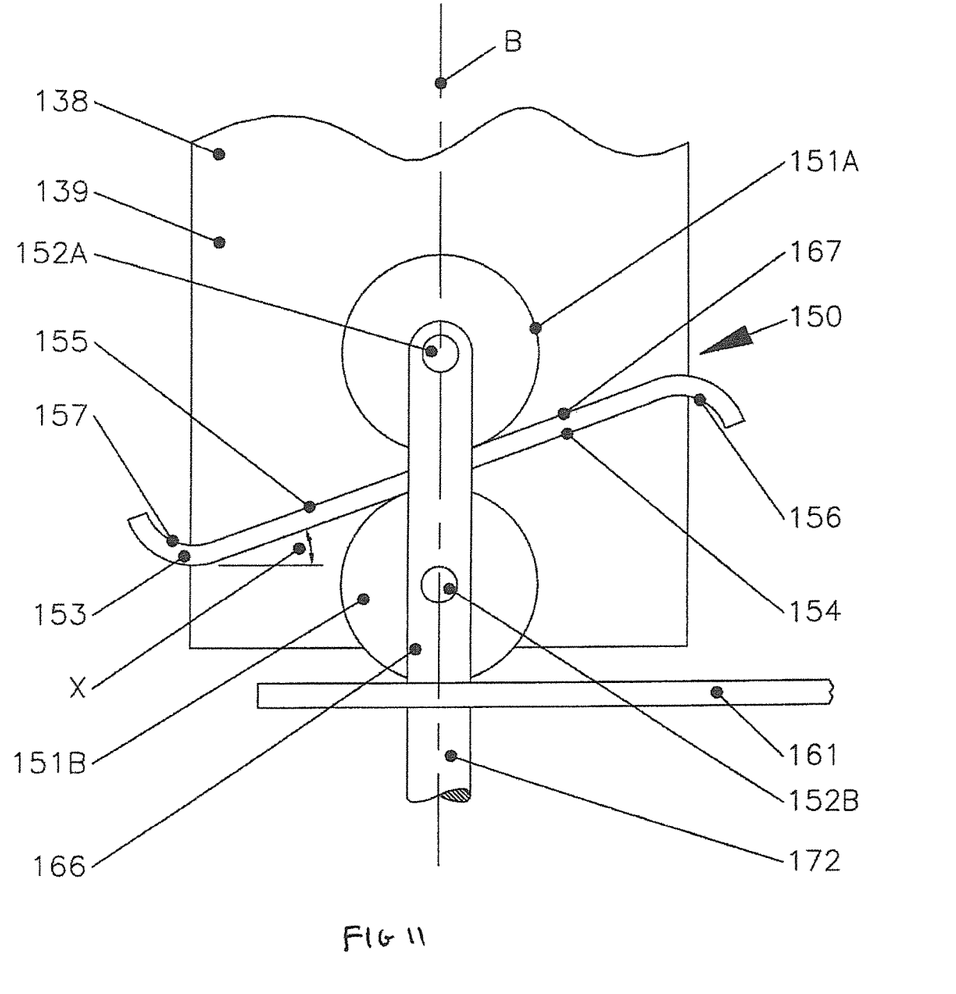
FIG. 11 is a view of part of an alternative mechanism for use in an assembly according to the present invention.

FIG. 11 shows a further embodiment of a mechanism 150 with the features that fulfil the same function as mechanism 50 being labelled 100 greater. In this case the central section 139 of the column 138 is circular and ramp arrangement 153 is attached to the lower part of the central section 139. The ramp arrangement 153 has a first ramp 154, a second ramp 155, a first stop 156 and a second stop 157. In this case the ramp arrangement 153 is arcuate (when viewed in plan) and welded or otherwise attached to the central section 139. The mechanism 150 includes a first wheel 151A which is rotatable about a generally horizontal axis defined by fixing bolt 152A and a second wheel 151B which is rotatably about a generally horizontal axis defined by fixing bolt 152B. In this case fixing bolts 152A and 152B attach their respective wheels 151A and 151B to a bracket 166 which is fixed to plinth 161. Lifting of the column via the hydraulic ramp (not shown) moves the actuating shaft 172 which causes the column to rotate in an anticlockwise direction (when viewed in plan) and lowering of the column causes rotation in a clockwise direction (when viewed in plan). First stop 156 therefore prevents rotation of the column past the fully deployed position and stop 157 prevents movement of the column past the park position. Column 139 includes a further mechanism (not shown) similar to mechanism 150 on an opposite side of the column from mechanism 150.

As will be appreciated, the ramp angle X relative to the horizontal (see FIGS. 11 and 5) is a factor in determining how hard the brushes are forced against a vehicle. Whilst any ramp angle may be chosen, experiments have shown that a ramp angle of approximately 12° provides a suitable force between the bristles and the vehicle. However other ramp angles, in particular ramp angles between 7° and 17° have also proved satisfactory.

In further embodiments it is not necessary for the ramp angle to be constant over the whole arc of movement of the arm 32. For example when the brush is at its fully deployed position, the wheel 51 may be in contact with a relatively steep part of a ramp (for example the ramp may be locally angled at 17°) whereas when the brush is in a deployed position when it is cleaning a side of a vehicle the wheel 51 may be in contact with a relatively shallower angled part of the ramp, for example the ramp may be locally angled at 7°.

Alternatively, when the arm is in a fully deployed position the ramp angle may be relatively shallow, for example 7° and when the brush is cleaning a side of the vehicle, the ramp angle may be relatively steep, for example 17°.

As the brush transitions from cleaning the front of the vehicle to the side of the vehicle, if the vehicle is being driven too fast the brush can tend to bounce away from the vehicle, i.e. the arm 32 can tend to swing too far anticlockwise. Experiments have shown that the second ramp 55 helps to reduce brush bounce. Furthermore, by arranging the first ramp 54 to have a different angle depending upon the position of the associated arm can also help to reduce brush bounce.

Arm 32 comprises various sections including inner part 33, outer part 34, horizontal bracing struts 35, vertical bracing struts 36 and diagonal bracing struts 37. However, in further embodiments any type of arm could be used to hold the associated brush in a generally vertical position and allow the arm and brush to rotate about a generally vertical axis. As previously described, the arm 32 is attached to a column 38, but it is not necessary to provide a column. All that is necessary is to provide suitable structure to allow the arm to rotate about a generally vertical axis and this need not be in the form of a column 38. As previously described, the column 38 is supported by support columns 44 which are attached to the ground via base plate 45. However, the support column 44 and base plate 45 are not required. All that is necessary is suitable structure to allow the arm to rotate about a generally vertical axis.

As previously described, mechanism 50 includes ramp arrangement 53 and further ramp arrangement 53'. Whilst it is beneficial to provide two ramp arrangements to balance out forces nevertheless in an alternative embodiment only one ramp arrangement may be provided. Alternatively, in another embodiment three ramp arrangements or more may be provided.

As previously described, the first stop 56 and second stop 57 are contiguous with the first ramp 54 and second ramp 55. Further embodiments the stops may be provided separately, and in particular on any suitable part of the structure. As previously described the first ramp 54 and second ramp 55 are provided as part of a hole 58 in circular tube 59. However, in further embodiments any suitable ramp could be provided and it need not be provided on a circular tube. As previously described, first and second ramps 154 and 155 are provided on opposite sides of plate 167. However, in further embodiments any suitable structure could be useful providing ramps 154 and 155.

As previously described first ramps 54, 154 work in conjunction with respective second ramps 55, 155. In further embodiments the second ramp 55, 155 is not necessary. Under such circumstances the arm could be returned to the parked position by an actuator, in particular a hydraulic actuator acting on another part of the column or arm. In particular an actuator, in particular a hydraulic actuator could be arranged horizontally and attached to a further arm or like structure attached to the column or arm 32 in order to return the arm 32 to the parked position. In particular it is advantageous to use hydraulics to both rotate the brushes and also move the brush thin to the parked position. This is because hydraulic actuators are inherently resistant to wet conditions, as encountered around washing facilities. Furthermore, by arranging hydraulic actuators to move the arms to the parked position and also rotate the brushes, only one type of power source is required. In particular a single hydraulic pump can be used to power each motor used to rotate the first, second, third and fourth brushes and also power the actuators used to return the first, second, third and fourth brushes to the parked position. This can be contrasted with prior art brush washers which use pneumatics to move the brush to the parked position and use an electric motor to rotate the brushes.

When hydraulics are used to both rotate the brushes and move the arm to the parked position then a single pump can be used which can be driven by a single electric motor. Where two washing facilities are installed in close proximity to each other, and where both washing facilities used hydraulic motors to rotate the brushes and hydraulic actuators to move the arm to the parked position, then a single hydraulic pump can be used to provide pressurized hydraulic fluid to both washing facilities and a single motor, for example a single electric motor can be used to drive that single pump.

However, in further embodiments one hydraulic pump can be used to power each of the motors used to rotate the first, second, third and fourth brushes and a second hydraulic pump can be used to power the actuators used to return the first, second, third and fourth brushes to the parked position. In this way control of the rotation of the brushes is separate from control of the movement of the arms on which the brushes are mounted.

The invention claimed is:

1. An assembly including an arm having a rotatable brush for cleaning a vehicle, the arm being rotatable about a generally vertical axis to move the brush between a parked position and a deployed position, the arm being supported by a mechanism such that the arm is in a raised position when the brush is in the parked position and the arm is in a lowered position when the brush is in the deployed position and the arm is biased to move the brush towards the deployed position by the mechanism, wherein the mechanism includes a ramp arrangement having a ramp to move the arm between the raised position and the lowered position.

2. The assembly as defined in claim 1 wherein the arm is rotatable relative to the ramp.

3. The assembly as defined in claim 1 wherein the arm includes a ramp follower for engaging the ramp.

4. The assembly as defined in claim 3 wherein the ramp follower is defined by a wheel rotatable about a generally horizontal axis.

5. The assembly as defined in claim 4 wherein the mechanism includes a first stop and the follower engages the first stop to prevent the brush moving past a fully deployed position.

6. The assembly as defined in claim 4 wherein the mechanism includes a second stop and the follower engages the second stop to prevent the brush moving past the parked position.

7. The assembly as defined in claim 1 wherein the ramp arrangement includes a further ramp for controlling rotational movement of the arm positioned generally parallel to the ramp on an opposite side of the follower to the ramp.

8. The assembly as defined in claim 7 wherein the ramp is positioned below the follower and the further ramp is positioned above the follower.

9. The assembly as defined in claim 7 wherein the further ramp is contiguous with the first stop.

10. The assembly as defined in claim 7 wherein the further ramp is contiguous with the second stop.

11. The assembly as defined in claim 1 wherein the arm is fixed to the ramp arrangement such that the arm and the ramp are rotatable about said generally vertical axis.

12. The assembly as defined in claim 11 wherein the arm is supported on a support structure which includes a ramp follower for engaging the ramp.

13. The assembly as defined in claim 12 wherein the ramp follower is defined by a wheel rotatable about a generally horizontal axis.

14. The assembly as defined in claim 11 wherein the arm includes a further ramp positioned generally parallel to the ramp and the support structure includes a further ramp follower for engaging the further ramp to control movement of the arm.

15. The assembly as defined in claim 1 wherein said ramp arrangement is a first ramp arrangement, the mechanism including a further ramp arrangement.

16. The assembly as defined in claim 1 including an actuator for lifting the arm from the lowered position to the raised position such that the mechanism moves the brush from the deployed position to the parked position.

17. The assembly as defined in claim 16 wherein the actuator is a hydraulic actuator.

18. The assembly as defined in claim 17 including a hydraulic pump for providing pressurized hydraulic fluid to the hydraulic actuator.

19. The assembly as defined in claim 18 including a motor for driving the hydraulic pump.

20. The assembly as defined in claim 1 wherein the brush is rotatable in one of a clockwise or anticlockwise direction about a generally vertical brush axis and the arm moves in said one of a clockwise or anticlockwise direction when moving from the deployed position to the parked position.

21. The assembly as defined in claim 1 including a hydraulic motor for rotating the brush about a generally vertical brush axis.

22. The assembly as defined in claim 21 wherein the hydraulic motor is positioned beneath the brush.

23. The assembly as defined in claim 21 wherein the hydraulic motor has an output shaft which is coupled directly to a brush shaft.

24. A vehicle washing facility for washing road vehicles including four assemblies as defined in claim 17, each assembly including a hydraulic motor for rotating the brush about a generally vertical brush axis, said vehicle washing facility further including a hydraulic pump for providing pressurized hydraulic fluid to the hydraulic actuators and the hydraulic motors, and a motor for driving the hydraulic pump.

* * * * *

UNITED STATES PATENT AND TRADEMARK OFFICE
CERTIFICATE OF CORRECTION

PATENT NO. : 10,173,648 B2
APPLICATION NO. : 14/698060
DATED : January 8, 2019
INVENTOR(S) : Hiscock et al.

Page 1 of 1

It is certified that error appears in the above-identified patent and that said Letters Patent is hereby corrected as shown below:

In the Specification

At Column 8, Line 2, the text "move the brush thin to the parked position." should be changed to -- move the brush arm to the parked position. --

Signed and Sealed this
Sixth Day of August, 2019

Andrei Iancu
*Director of the United States Patent and Trademark Office*